United States Patent [19]

Kuhn

[11] 4,266,130
[45] May 5, 1981

[54] METHOD AND APPARATUS FOR DETECTING CLEAR AIR TURBULENCES

[75] Inventor: Peter M. Kuhn, Boulder, Colo.

[73] Assignee: The United States of America as represented by the Secretary of Commerce, Washington, D.C.

[21] Appl. No.: 950,943

[22] Filed: Oct. 13, 1978

[51] Int. Cl.³ .................................................. G01J 1/00
[52] U.S. Cl. ..................................... 250/339; 250/342
[58] Field of Search ............... 250/338, 342, 340, 339; 73/170 R, 355 R; 343/100 ME

[56] References Cited

U.S. PATENT DOCUMENTS

| | | | |
|---|---|---|---|
| 3,359,557 | 12/1967 | Fow et al. | 73/170 R |
| 3,380,055 | 4/1968 | Fow et al. | 73/355 R |
| 3,475,963 | 11/1969 | Astheimer | 73/355 R |
| 3,696,670 | 10/1972 | Collis | 250/338 |
| 3,935,460 | 1/1976 | Flint | 250/349 |

OTHER PUBLICATIONS

Kuhn et al., "Clear Air Turbulence: Detection by Infrared Observations of Water Vapor", Science, vol. 196, Jun. 3, 1977, pp. 1099–1100.
Kuhn et al., "Water Vapor: Stratospheric Injection by Thunderstorms", Science, vol. 174, Dec. 24, 1971, pp. 1319–1321.
Kuhn, "Zonal Profiles of Atmospheric Water Vapor", NOAA Tech. Rpt. ERL-319-APCl-33, 3-75.
Kuhn et al., "Stratospheric Areal Distribution of Water Vapor Burden and the Jet Stream", Geophys. Res. Letters, vol. 3, No. 9, 9-76, pp. 529–532.
Kuhn et al., "Radiometric Observations of Atmospheric Water Vapor Injection by Thunderstorms", J. Atmos. Sci., vol. 30, No. 3, 4-73, pp. 507–509.
Elson, "Radiometer Studied as Turbulence Sensor", Aviation Week & Space Tech., 5-12-75, p. 30.

*Primary Examiner*—Davis L. Willis
*Assistant Examiner*—Carolyn E. Fields
*Attorney, Agent, or Firm*—Eugene J. Pawlikowski; Alvin J. Englert

[57] ABSTRACT

An improved clear air turbulence (CAT) detector sensing infrared radiation in the 27–33 micrometer range of the water vapor rotational wavelength band. The improved clear air turbulence detector for use on an aircraft includes a forward looking and upwardly oriented between 8° to 12° optical assembly having a thallium bromoiodide infrared lens, a 27–33 micrometer wavelength interference filter and an infrared detector; a radiometer amplifier for amplifying the output of the optical assembly and for generating an analog voltage signal related to the received infrared intensity, a processing unit for analyzing the analog signal, and a display unit for generating a first signal when no clear air turbulence is detected, a second signal when a moderate turbulence is detected, and a third signal when extreme turbulence is detected. A method for determining the advance time for entering the clear air turbulence after detection is based upon the altitude of the aircraft.

8 Claims, 9 Drawing Figures

METHOD AND APPARATUS FOR DETECTING CLEAR AIR TURBULENCES

BACKGROUND OF THE INVENTION

1. Field of the Invention

This invention relates generally to clear air turbulence detection means and more particularly to an improved system and method for detecting regions of clear air turbulence through detection of infrared radiation in the water vapor rotational wavelength band.

2. Description of the Prior Art

Clear air turbulence, often termed CAT, is a region of high turbulence encountered by an aircraft without visual or radar warning. CAT includes all forms of turbulence occurring in clear air which do not involve convective forces.

Two separate conditions are known which result in a CAT. The first condition is created by a standing wave found in the lee of a mountain barrier which occurs when statically stable air is carried over the mountains. The second condition results from waves formed in statically stable layers in the atmosphere that are subjected to sufficiently strong vertical wind gradients (shear). These shear-induced waves are commonly referred to as Kelvin-Helmholtz (KH) waves.

It is virtually impossible to predict in advance when and where an individual CAT will occur. P. C. Patnaik, F. S. Sherman and G. M. Corcos, "A Numerical Simulation of Kelvin-Helmholtz Waves of Finite Amplitude," *Journal of Fluid Mechanics;* 73(2n), 215 (1976). There are, however, several approaches for CAT detection. Prior art approaches for detecting CAT have been based primarily on temperature gradients existing in a CAT. Temperature gradients have been priorly detected by receiving microwave or infrared energy from the $CO_2$ band of the spectrum with a radiometric receiver and processing that information. One such temperature gradient approach was set forth by R. W. Astheimer in *Applied Optics,* Vol. 9, page 1789 (1970).

U.S. Pat. No. 3,696,670 issued to Collis on Oct. 10, 1972 entitled "Method and System for Detecting Clear Air Turbulence" summarizes these prior art approaches as follows:

"In order to provide remote warning of clear air turbulence that is directly associated with horizontal temperature gradients a number of radiometric techniques have been proposed and tried to detect such gradients ahead of an aircraft. One prior art system accomplishes this by radiometric scanning in frequency on the skirts of the $CO_2$ absorption band in order to provide an instantaneous reading of temperature variation along the aircraft path, which will thus show anomalies in gradients. In another prior system there is provided at each instant a single reading of effective temperature which is integrated over the whole path ahead of the aircraft and time history is relied upon to remotely reveal anomalies in the temperature gradients in the direction of the aircraft's path. These systems have, however, had disadvantages. They have been complex and expensive and have required a reference, such as black body for example, with which to compare the signals received by the radiometric receiver or radiometer. There have also been problems in stabilizing the airborne radiometers. Inasmuch as temperature varies considerably with vertical distance or altitude small pitch variations in the radiometer's alignment produces substantial error and noise into its readings. (Column 1, lines 41-64)."

Collis, thereupon, set forth a method and system which utilized at least two remote atmospheric regions ahead of the aircraft's path for detecting CAT. The temperatures in these remote atmospheric regions were detected and compared according to a disclosed processing arrangement. Collis essentially required duplication of equipment by requiring the presence of at least two radiometers. The approach set forth by Collis relied upon the temperature difference sensed in at least two atmospheric volumes.

All of the above prior art approaches used a horizontal or vertical temperature gradient detection process. However, it has been recently postulated that temperature gradients obtained from aircraft temperature sensors do not correlate with CAT statistics. M. A. Bender, H. A. Panofsky and C. A. Pesten, "Temperature Gradients and Clear Air Turbulence," *Journal of Applied Meteorology* 15, 1193-1199 (1976).

The main problem with these prior art approaches relates to the unsatisfactory high failure rate of detection. Collis in his U.S. Pat. No. 3,696,670 suggested the use of a detector based on water vapor anomalies (Column 5, lines 39-43). Subsequently and without knowledge of Collis' suggestion, the inventor accidentally discovered the detector of CAT through detection of anomalies in the water vapor band. This event was published in Elson, "Radiometer Studied as Turbulence Sensor", *Aviation Week* (May 12, 1975). Prior to this discovery the inventor with others was performing research into atmospheric water vapor:

(1) P. M. Kuhn, M. S. Lojko and E. V. Petersen, "Water Vapor: Stratospheric Injection by Thunderstorms", *Science,* Vol. 174, pages 1319-1321 (Dec. 24, 1971).

(2) P. M. Kuhn and L. P. Stearns, "Radiometric Observations of Atmospheric Water Vapor Injection by Thunderstorms", *Journal of Atmospheric Sciences,* Vol. 30, pages 507-509 (April, 1973).

(3) P. M. Kuhn, "Zonal Profiles of Atmospheric Water Vapor", *NOAA Technical Report,* ERL 319-APCL 33 (March 1975).

(4) P. M. Kuhn, L. P. Stearnes, M. S. Lojko, "Latitudinal Profiles of Stratospheric Water Vapor", *Geophysical Research Letters,* Vol. 2, page 227 (June 1975).

(5) P. M. Kuhn, E. Magaziner, and L. P. Stearns, "Stratospheric Areal Distribution of Water Vapor Burden and the Jet Stream", *Geophysical Research Letters,* page 529 (September 1976).

In "Clear Air Turbulence: Detection by Infrared Observations of Water Vapor", *Science,* Vol. 196, 1099-1100 (June 3, 1977), the inventor set forth an operational CAT-sensing radiometer detecting system detecting the infrared radiation from the water vapor rotational bands at 6.3 micrometers and at 19.0 to 37.0 micrometers. The radiometer system had as its goals (1) to develop a simple water vapor and radiometer system of modest cost that can operate unattended and can achieve accuracy in alerting crews to CAT encounters from 4.0 to 10.0 minutes before the event and (2) to study the most probable mechanisms which allow the passive detection of CAT in the water vapor IR bands. This CAT radiometer tentatively considered use of the water vapor IR bands in the 19.0 to 37.0 micrometer range with a forward looking and directed upward sensor to 2.5° to 7.5° fixed elevation angle from the airplane path. Initial results indicated an 80% CAT detection with a 4-7 minute warning of the impending CAT. However, the results obtained were general, and further experimentation on the band width, field of view, and elevation angle was deemed, in the article, to be warranted. Furthermore, the severity of CAT was suggested as being possible of measurement although no system or method was proposed. The detection system set forth in the above article, however, was a proof-of-the-principle apparatus and has, now, been significantly improved upon under the teachings of the present invention.

OBJECTS OF THE INVENTION

It is an object of the present invention to provide an improved and novel apparatus for detecting clear air turbulences.

It is a further object of the present invention to provide an improved and novel clear air turbulence detector based upon receiving infrared radiation in the 27-33 micrometer wavelength range of the water vapor rotational band in a single atmospheric volume.

It is a further object of the present invention to provide an improved and novel clear air turbulence detector for receiving infrared radiation in the water vapor rotational wavelength band through a thallium bromoiodide lens.

It is a further object of the present invention to provide an improved and novel clear air turbulence detector utilizing the infrared radiation in the water vapor rotational wavelength band and directing said radiation through a 27-33 micrometer wavelength interference filter.

It is a further object of the present invention to provide an improved and novel clear air turbulence detector which detects infrared radiation in a single atmospheric volume of the water vapor rotational wavelength band at an upward elevation of 8° to 12° from the flight path of an airplane.

It is a further object of the present invention to provide an improved system for detecting clear air turbulence wherein a first alert signal is generated whenever the intensity of the detected clear air turbulence is between 0.1 G and 0.4 G and wherein a second alert signal is generated whenever the detected clear air turbulence is of an intensity greater than 0.4 G.

It is a further object of the present invention to provide an improved and novel system for detecting clear air turbulence wherein the analog signal proportional to the sensed infrared radiation has its arc length ratio determined and compared to a predetermined value.

It is a further object of the present invention to provide an improved and novel system for detecting clear air turbulence wherein the analog signal proportional to sensed infrared radiation has its standard deviation determined and compared to a predetermined value.

It is a further object of the present invention to provide an improved and novel system for detecting clear air turbulence wherein the analog signal proportional to sensed infrared radiation has its multiple probability including arc length ratio and standard deviation determined and compared to a predetermined value.

It is another object of the present invention to provide a new and novel method for determining the advance time for entry of clear air turbulence by an aircraft.

Other objects, advantages and capabilities of the present invention will become more apparent as the description proceeds in conjunction with the accompanying drawings.

SUMMARY OF THE INVENTION

The present invention comprises a clear air turbulence detector that is suitable for use on aircraft to provide advance warning of clear air turbulence. The present invention presents an improvement over existing clear air turbulence detectors in that a lower false alarm rate for detecting clear air turbulence is achieved through an optimization of components and systems. The clear air turbulence detector of the present invention includes a set of optics for detecting infrared radiation in the water vapor rotational wavelength band in a single atmospheric volume located above and ahead of the aircraft, a radiometer amplifier for amplifying the detected radiation into an analog voltage signal, a signal processor processing the analog signal according to a predetermined format and comparing this signal to predetermined values, and an alerting system responsive to the presence of a clear air turbulence ahead of the aircraft. Furthermore, under the method of the present invention, a chart is provided to enable the operator of the aircraft to ascertain the time it will take for the aircraft to encounter the clear air turbulence based upon the aircraft's altitude. This chart information can be incorporated into the microprocessor.

The optical assembly is oriented to receive the infrared radiation from the single atmospheric volume ahead of the aircraft at an upward elevation between 8° to 12° from the flight path of the airplane. The optical assembly receives radiation in the 27-33 micrometer wavelength range by utilizing a thallium bromoiodide lens and a 27-33 micrometer wavelength interference filter. The infrared radiation concentrated by the lens and filter is sensed by a detector which converts the radiation into an analog voltage signal. The radiometer amplifier receives this voltage signal and amplifies the signal into a second analog voltage signal which corresponds in intensity to the intensity of the received infrared radiation.

The analog voltage signal from the radiometer is delivered into a signal processor which, in the present invention, can comprise at least three different embodiments. In one embodiment, the arc length of the analog signal is calculated and is compared to a predetermined arc length ratio. When the predetermined arc length ratio exceeds the determined arc length ratio by a first predetermined amount, a first alert is signalled. In the event the predetermined arc length ratio exceeds a second predetermined arc length ratio, a second alert signal is generated. In other embodiments, standard deviations and multiple probability techniques are used.

The alert signals are correlated so that when the intensity of the received radiation corresponds to a clear air turbulence between 0.1 G and 0.4 G, a first alert signal is generated and a corresponding alarm is sounded by the alert device. In the event that the received radiation is indicative of a clear air turbulence having an intensity greater than 0.4 G, the second alert signal is generated to sound a second alarm in the alert device.

GENERAL DISCUSSION

Figure 1:
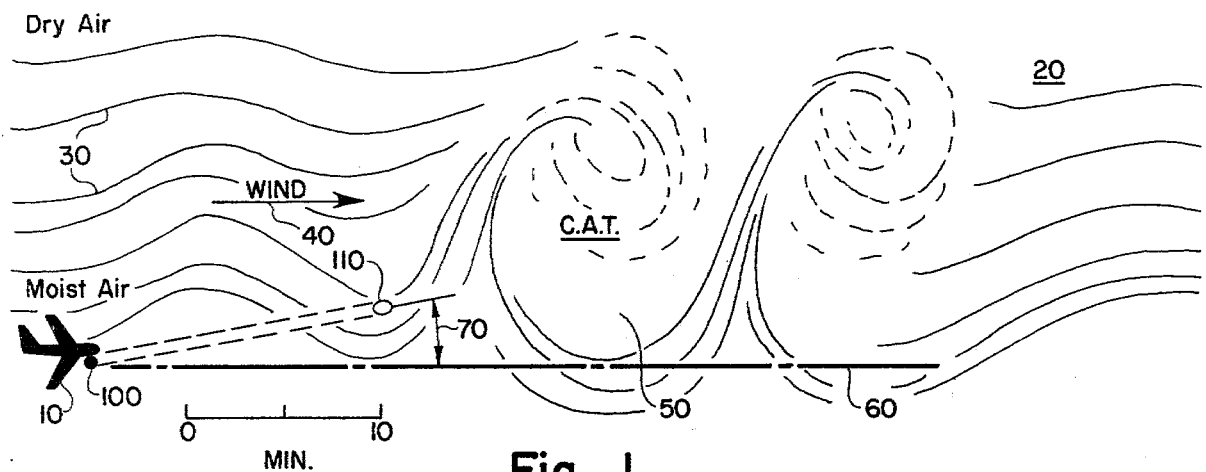
FIG. 1 is an illustration of the clear air turbulence detector of the present invention being utilized by an airplane in an atmosphere containing clear air turbulence.

In FIG. 1 is set forth the phenomenon thought to be detected by the present invention. An airplane 10 is flying in the earth's atmosphere 20. The earth's atmosphere 20 has gradients of air 30 containing varying degrees of moisture. Basically, the greater the elevation in the atmosphere, the drier or less moist atmospheric air becomes. In the event of a gradient in wind 40 between the upper and lower levels, a clear air turbulence (CAT) 50 can be generated. The CAT 50 is an area of turbulence, appearing to be similar to the crest of a wave in the water. This turbulence has high anomalies of water density due to the shear conditions. Hence, it is desirable, as shown in FIG. 1, for the airplane 10 to detect the presence of a CAT 50 significantly prior, in time, to entry of the CAT 50.

Under the teachings of this invention, the airplane 10 is equipped with a CAT detector 100 of the present invention which sensed water vapor anomalies occurring in a predetermined single atmospheric volume of air 110 located ahead of the airplane 10. In the preferred embodiment, the single atmospheric volume 110 is located 8° to 12° above the flight path 60 as indicated by arrows 70.

Figure 2:
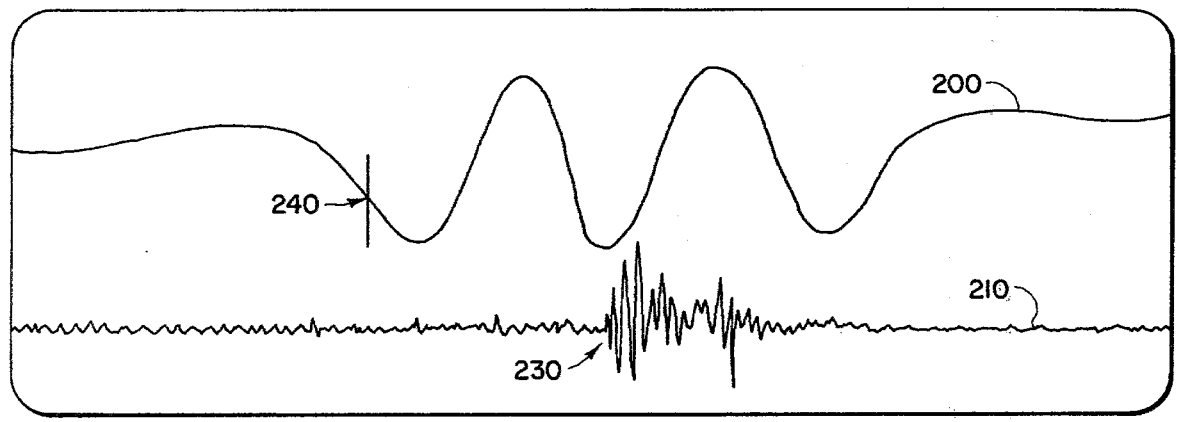
FIG. 2 is a graphical representation of the analog output of the clear air turbulence detector of the present invention and of an accelerometer output.

A typical output of a radiometer detecting the infrared water vapor bands is shown in FIG. 2 and is generally depicted as curve 200. An accelerometer placed on the aircraft 10 detects when the aircraft enters CAT as indicated by curve 210 of FIG. 2. Specifically, it is to be noted that curve 200 corresponding to an analog readout of the infrared radiation from the water vapor pertaining to the single volume 110 commences to change significantly in time prior to the encounter with the CAT as shown by accelerometer indications 230. This warning indicated by point 240 occurs several minutes prior to the encounter with the CAT 50.

DETAILED DISCUSSION

Figure 3:
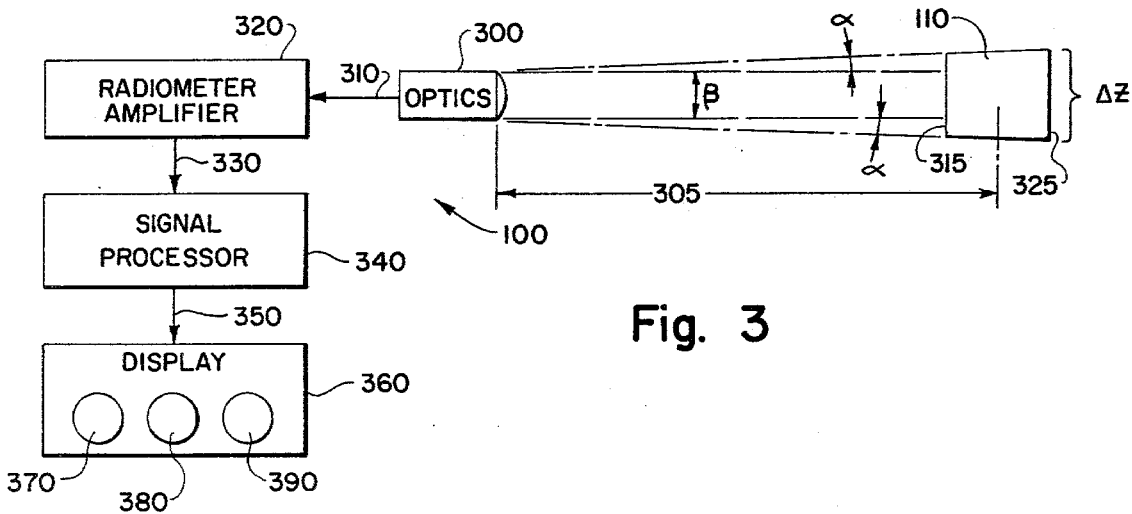
FIG. 3 is a block diagram of the various components of the clear air turbulence detector of the present invention.

In FIG. 3, the block diagram details of the detector of the invention 100 are shown analyzing the infrared radiation from the water vapor rotational band of a single atmospheric volume 110. The infrared radiation from the atmospheric volume 110 is detected by optics 300 which, in turn, deliver analog signals over path 310 to a radiometer amplifier 320. Signals from the radiometer amplifier are then delivered over path 330 to a signal processor 340 and thence over path 350 to an alerting display 360.

The volume of atmospheric air 110 generally has a vertical depth of DELTA Z which is defined by the beam width, ALPHA, and the lens width, BETA. In a typical application the center of the atmospheric volume 110 is located 40 kilometers from the optics 300 with a front vertical depth 315 of approximately 600 meters and a rear vertical depth 325 of approximately 700 meters. A horizontal distance of approximately 10 kilometers exists between surfaces 315 and 325. Hence, the atmospheric volume 10 substantially resembles that of a truncated cone in configuration.

The optics 300 receive the infrared radiation from the atmospheric volume 110 and produces an analog signal corresponding to the intensity of the infrared radiation on leads 310. The intensity of the analog signal corresponding to the infrared radiation varies as shown in curve 200 of FIG. 2. The radiometer amplifier 320 processes the signals from the optics 300 and, in turn, delivers an analog signal on leads 330 which is processed by the signal processor 340. As will be discussed in the following, the presence of certain relationships cause the signal processor 340 to output display signals on leads 350 to the CAT alerting display 360. The display, of necessity, is simple, being comprised of three lights 370, 380 and 390. Light 370 is green (or blue) and indicates an all clear condition. The yellow (or amber) light 380 indicates the presence of A CAT 50 having light or moderate turbulence, whereas the red light 390 indicates the presence of a CAT 50 having severe or extreme turbulence. Light to moderate turbulence is defined as being in the range of 0.1 G to 0.4 G (G=980 $cm/sec^2$), while severe or extreme turbulence is defined as greater than 0.4 G.

Figure 4:
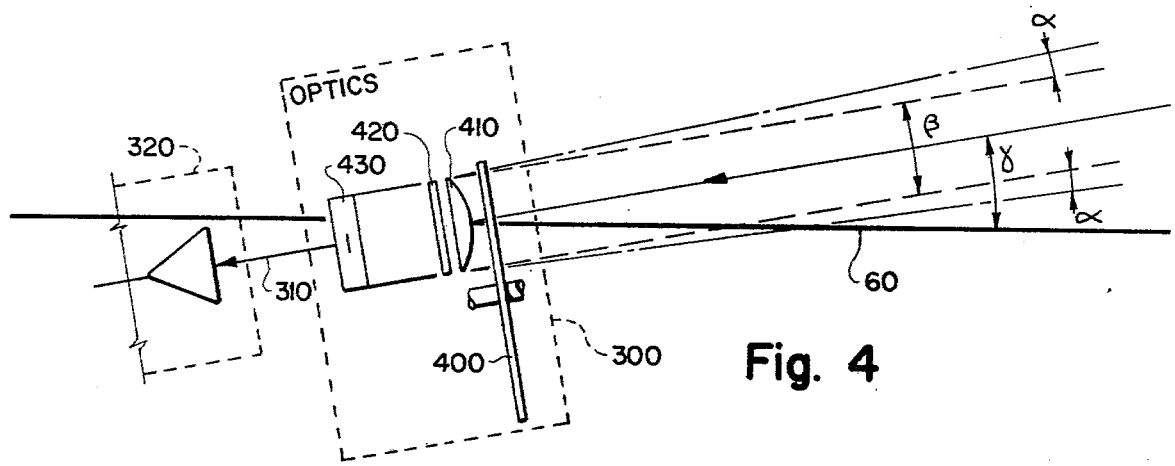
FIG. 4 is a diagrammatic representation of the optics utilized by the clear air turbulence detector of the present invention, FIG. 5 sets forth, in graphical format, the relative transmission versus wavelength of three experimental filter systems showing the desirability of the 27–33 micrometer pass band of the present invention determined by the $SrF_2$ crystals.

The details of the optics 300 are shown in FIG. 4 to include a chopper 400, a lens 410, a filter 420, and the sensor 430. In the preferred embodiment, the chopper 400 operates at 100 Hz. The lens 410 is a 2° lens and is custom made by Infrared Laboratories located in Tucson, Arizona and is manufactured from material known as KRS-5 which is a thallium bromoiodide composition. The actual focal length of the lens is 19.5 millimeters with a field of view being 2.94°. The lens 410 is A.R. (i.e., Anti-Reflection) coated for peak transmission in the 25–35 micrometer range. The following table sets forth the transmission data:

| Wavelength (microns) | Transmission | Wavelength (microns) | Transmission | Wavelength (microns) | Transmission |
|---|---|---|---|---|---|
| 7.5 | .889 | 22.5 | .966 | 37.5 | .815 |

| Wavelength (microns) | Transmission | Wavelength (microns) | Transmission | Wavelength (microns) | Transmission |
| --- | --- | --- | --- | --- | --- |
| 8.0 | .987 | 23.0 | .971 | 38.0 | .804 |
| 8.5 | 1.0 | 23.5 | .978 | 38.8 | .793 |
| 9.0 | .989 | 24.0 | .982 | 39.0 | .782 |
| 9.5 | .942 | 24.5 | .985 | 39.5 | .771 |
| 10.0 | .916 | 25.0 | .988 | 40.0 | .760 |
| 10.5 | .889 | 25.5 | .984 | 40.5 | .744 |
| 11.0 | .853 | 26.0 | .980 | 41.0 | .728 |
| 11.5 | .833 | 26.5 | .980 | 41.5 | .712 |
| 12.0 | .810 | 27.0 | .979 | 42.0 | .696 |
| 12.5 | .789 | 27.5 | .980 | 42.5 | .680 |
| 13.0 | .789 | 28.0 | .979 | 43.0 | .660 |
| 13.5 | .778 | 28.5 | .969 | 43.5 | .640 |
| 14.0 | .756 | 29.0 | .959 | 44.0 | .620 |
| 14.5 | .806 | 29.5 | .948 | 44.5 | .600 |
| 15.0 | .797 | 30.0 | .938 | 45.0 | .580 |
| 15.5 | .818 | 30.5 | .934 | 45.5 | .560 |
| 16.0 | .845 | 31.0 | .931 | 46.0 | .540 |
| 16.5 | .859 | 31.5 | .927 | 46.5 | .507 |
| 17.0 | .866 | 32.0 | .924 | 47.0 | .473 |
| 17.5 | .875 | 32.5 | .920 | 47.7 | .440 |
| 18.0 | .886 | 33.0 | .906 | 48.0 | .404 |
| 18.5 | .908 | 33.5 | .892 | 48.5 | .368 |
| 19.0 | .908 | 34.0 | .878 | 49.0 | .332 |
| 19.5 | .909 | 34.5 | .864 | 49.5 | .296 |
| 20.0 | .932 | 35.0 | .850 | 50.0 | .260 |
| 20.5 | .950 | 35.5 | .834 | 55.0 | .007 |
| 21.0 | .953 | 36.0 | .836 | 60.0 | .002 |
| 21.5 | .959 | 36.5 | .829 | 65.0 | .000 |
| 22.0 | .960 | 37.0 | .822 | 70.0 | .000 |

Lens 410 is properly termed an infrared window providing high transmission in the infrared ranges (the lens is peaked at 29 micrometers). Although a variety of other materials is available, the use of KRS-5 for this application proved optimum when cost and performance are both weighed (for example, diamond could be used but for its extreme cost). At the end of a six-month test period, transmission by the KRS-5 lens was reduced by only 1%. The vertical height of the lens 410 is 0.93 millimeters. In the Inventor's prior paper, a silicon lens was used and did not provide the optimum response obtained by the KRS-5 material.

The sensor 430 located at the focal point of the lens 410 is conventionally available as Model No. P1-70 and is a pyroelectric element manufactured by the Molectron Corporation, 177 North Wolfe Road, Sunnyvale, Calif. 94086.

Hence, the optics 300 serves to detect infrared radiation from the water vapor rotational bands in the 27–33 micrometer range. Furthermore, the optics 300 are attached to the aircraft so that they are oriented between 8° to 12° from the flight path 60 as generally indicated by GAMMA. In the preferred embodiment, an optimum angle of 10° for GAMMA is utilized.

Figure 5:
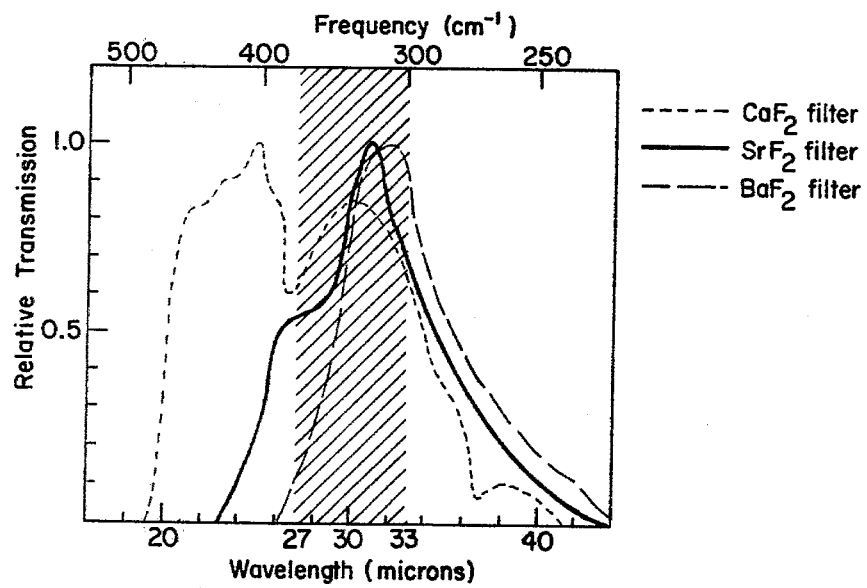

The selection of the filter 420 was based upon experimental flight tests. The flight tests totalling 695 flight hours were conducted aboard NASA's C-141-A jet laboratory and also aboard NASA's Lear research jet aircraft. The results of several different types of filter systems are shown in FIG. 5. Selective reflection or reststrahlen crystals were employed to define the short wavelength cut-on, since this wavelength range lies beyond the range of readily available interference filters. The three passbands shown in FIG. 5 are defined by crystals of $CaF_2$, $SrF_2$ and $BaF_2$. Thus, the radiometer amplifier 320 provides an analog output which is proportional to the incident radiance along the slightly elevated line-of-sight and in the spectral passband of an interference filter corresponding to the $SrF_2$ crystal passband. The fluctuation of this signal is monitored by the computation of a moving standard deviation and moving arc length ratio computed for a six-second interval from a one to five Hz digital sampling of the analog signal.

Data was acquired at various altitudes from 15,000 to 45,000 feet (4.6 to 13.7 kilometers). The shortest wavelength 20–34 micrometers for the $CaF_2$ crystal provided the longest range (or alert time) as a consequence of the lower water vapor opacity in this passband. However, flight tests show that, under similar turbulence conditions, the turbulence-caused increase in the standard deviation of the radiometer signal becomes larger for the longer wavelength passbands of shorter range. In the case of the 27–33 micrometer crystal ($SrF_2$) the turbulence-associated component of the signal standard deviation is approximately thirty percent larger than for the shorter 20–34 micrometer wavelength ($CaF_2$) passband. For the longest (29–36 micrometer) wavelength crystal but shortest range crystal ($BaF_2$), the enhancement over the $CaF_2$ is approximately seventy percent. Thus there is a basic trade-off between range (or alert time) and the size of the signal anomalies in response to turbulence. The flight results indicated that the middle-range $SrF_2$ (27–33 micrometer) crystal displayed the best performance characteristics for typical flight conditions. This passband has better response to turbulence and is less sensitive to distance cirrus formations than the shorter wavelength filter tested. While the longer wavelength 29–36 micrometer crystal ($BaF_2$) has excellent turbulence response, its shorter range implies marginally adequate alert time. For operation only at high altitudes in excess of approximately 30,000 feet, the longer passband may warrant further consideration.

Hence, based upon the results as shown in FIG. 5, the optimum filter for all purposes is an interference filter having a passband corresponding to the $SrF_2$ crystal operating in the range from 27–33 micrometers. This filter is manufactured by Optical Coating Laboratories, Inc., P.O. Box 1599, 2789 Griffen Avenue, Santa Rosa, Calif. 95402 as Model No. W15270-i and is comprised of a silicon substrate having a selected number of layers of absorbing and reflecting material deposited thereon.

The selection of the 8° to 12° angle for GAMMA or the angle the optics 300 are oriented above the flight path 60 were based upon some 80 test flights experiencing 149 encounters with CAT's on the C-141. The table set forth below gives the results of those test flights:

| Elev. Angle | Time to CAT | Failure Rate |
| --- | --- | --- |
| Zenith | 1.0 minute | — |
| 30° | 1.5–2.0 min. | 31% (61/194) |
| 15° | 2.5–3.0 min. | — |
| 10° | 4.5–5.5 min. | 7% (14/194) |
| 5° | 2.0–4.0 min. | — |
| 0° | Indeterminate | 29% (56/194) |
| −5° | Indeterminate | — |

Upon inspection of the above table, it is evident that a 10° elevation angle is optimum for operation of the detector 100 of the present invention.

Figure 6:
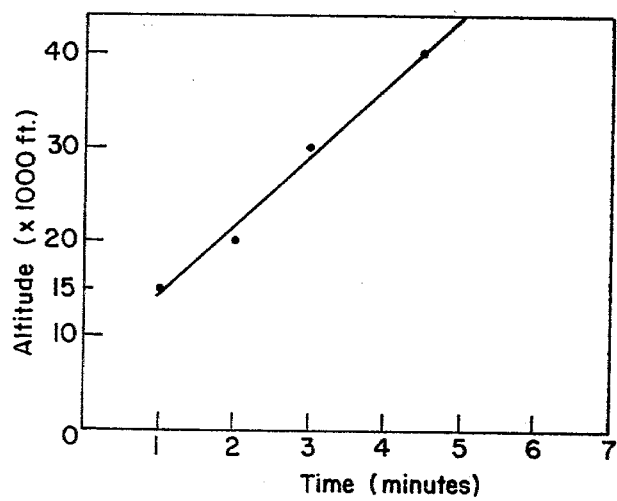
FIG. 6 is a chart illustrating the method of the present invention by which the pilot of an airplane can ascertain an advance warning of a clear air turbulence at a particular altitude, FIG. 7 sets forth in block diagram format are preferred embodiment for the signal processing of the arc length of the analog signal corresponding to the received infrared radiation, FIG. 8 sets forth in block diagram format one preferred embodiment for the signal processing of the standard deviation of the analog signal corresponding to the received infrared radiation, and FIG. 9 sets forth in block diagram format one preferred embodiment for the signal processing of the multiple probability of the analog signal corresponding to the received infrared radiation.

Finally, based upon 17 Lear jet missions with approximately 40 CAT encounters, a useful method and chart has been generated using the optimum elevation angle of 10° and 27–33 micrometer filter. The results of these flights are set forth in FIG. 6. It becomes evident that the lower in altitude the aircraft is flying, the less alert time presents itself upon encountering CAT. Specifically, typical jet passenger flights on commercial airlines are between 30,000 and 40,000 feet, through use of the detector 100 of the present invention, a pilot will have 3 to 4.5 minutes in which to react to a CAT. By knowing his altitude, and receiving an alert on the display 360, the pilot will know approximately how much time he has in which to prepare for entering the CAT. Generally, commercial airlines are not permitted to depart from their flight paths 60 and, thus, pilots are only permitted to decrease their air speed to lessen the effect of the CAT. By knowing the time of entry into the CAT and the projected severity of a CAT from display 360, the pilot can appropriately adjust his speed to maximize the comfort to the passengers. One skilled in the art can incorporate this method into the signal processor 340 and provide a read-out automatically providing the time to CAT entry as well as the CAT severity.

The output of the radiometer amplifier 320 is an analog voltage and can be subjected to several preferred methods of analysis. The first preferred method of analysis is based upon the arc length. Under this method of analysis the arc length is determined and defined by the following formula:

$$\text{Arc length} = \frac{\Sigma (1 + [V_{i+1} - V_i]^2)^{\frac{1}{2}}}{n}$$

Where
V = output voltage of radiometer 320
n = number of unit time intervals in which data points were acquired
i = "i-th" interval Within the definition of this algorithm, a straight-line line of equal voltage output would have an arc length ratio of "1". An anomalous radiometer output, therefore, would produce a larger than "1" arc length. If the arc length were greater than EPSILON where EPSILON is the arc length threshhold than a CAT alert would be forthcoming.

A second preferred method for analyzing the output of the radiometer 320 is the standard deviation method. In this method, the standard deviation, SIGMA, of a sample of "n" output voltages is computed either as a moving mean or as a stepped mean. If SIGMA is greater than or equal to EPSILON, where EPSILON is the threshold criterion for a CAT then an alert follows. The calculation of the standard deviation is made pursuant to well known mathematical techniques.

Finally, a third preferred method of analysis involves a multiple probability consideration of the arc length, the second difference, and the standard deviation. If the combined multiple probability is greater than EPSILON, where EPSILON is a threshold condition, a CAT alert follows. The second difference method was earlier set forth in the inventor's prior referenced paper entitled "Clear Air Turbulence Detection by Infrared Observations of Water Vapor". The multiple probability of a turbulence event occurring is defined as $P_c = P_c(P_1, P_2, P_3 \ldots P_n)$ where, in this case, $P_1$, $P_2$ and $P_3$ are respectively the predictors for CAT from the arc length algorithm, the standard deviation algorithm and the second difference algorithm. The formula above represents an n-dimensional space in which there are n-1 hyper-surfaces.

Figure 7:
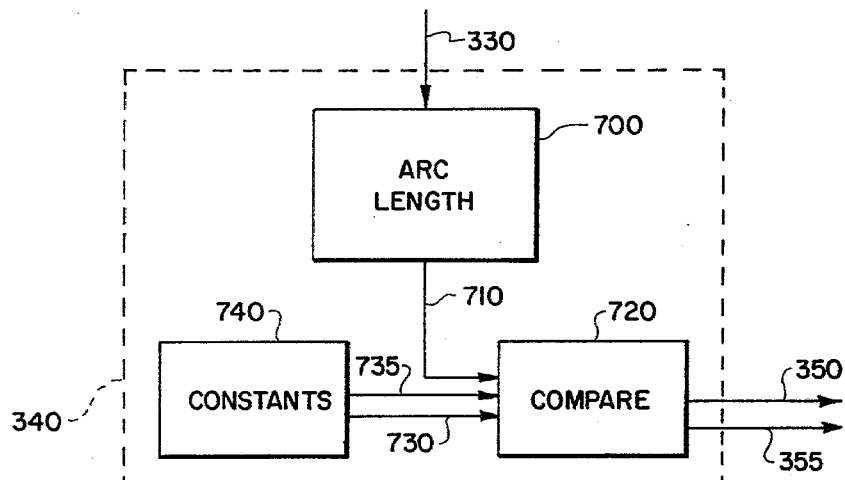

In FIG. 7, the signal processor 340 is shown in one preferred embodiment to be utilized as an apparatus having the following components of a device 700 for determining the arc length of the signal appearing on lead 330 from the radiometer 320. The determined arc length from device 700 is placed on lead 710 and is delivered into a comparator circuit 720. The comparator circuit 720 compares the determined arc length signal appearing on lead 710 with predetermined arc length values appearing on lead 730 from a device 740 which generates constant values. In the event the determined arc length signal appearing on lead 710 exceeds a first predetermined arc length signal appearing on lead 730, then the comparator circuit 720 outputs a signal on lead 350 to activate the yellow light 380 in the display circuit 360. In the event the determined arc length appearing on lead 710 exceeds a second predetermined arc length signal appearing on lead 735, then the comparator circuit 720 outputs a signal on lead 355 to activate the red light 340 in the display circuit 360.

Figure 8:
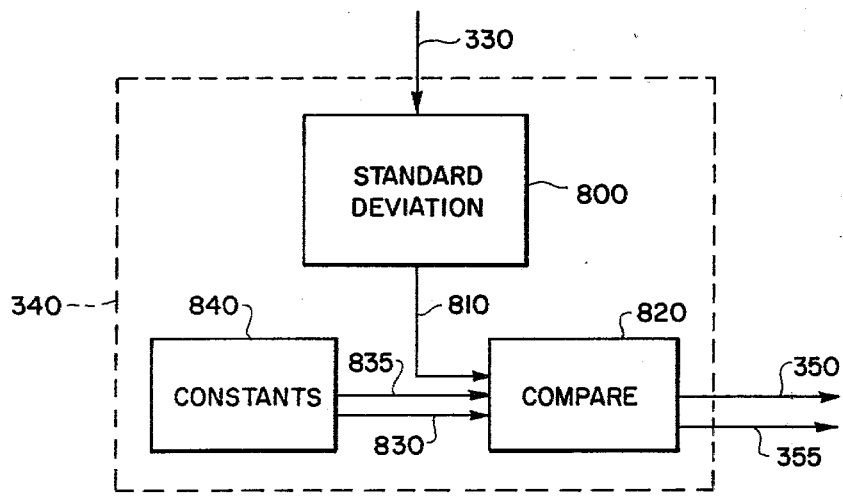

In FIG. 8, a second preferred embodiment for configuring the signal processor 340 is shown in which the incoming analog signal appearing on lead 330 is delivered into a device 800 which calculates the standard deviation of the signal. The determined standard deviation signal is placed on lead 810 and delivered into a comparator 820 for comparison with predetermined standard deviation signals appearing on leads 830 and 835 from a constants generator 840. In the event the determined standard deviation signal appearing on lead 180 exceeds the predetermined signals appearing on lead 830 and 835 as discussed above, the comparator 820 delivers the appropriate alert signals on leads 350 and 355 to activate the display 360.

In a third preferred embodiment for configuring the signal processor 340, the incoming analog signal from radiometer 320 appearing on lead 330 is delivered into a device 900 which determines the arc length of the analog signal and delivers the determined arc length signal on lead 910, the standard deviation in device 920 and delivers the standard deviation signal on lead 930 and the second difference device 940 which delivers the second difference signal on lead 950. The determined arc length signal appearing on lead 910, the determined standard deviation signal appearing on lead 930, and the second difference signal appearing on lead 950 are delivered into a device 960 which determines the multiple probability of the three signals. The determined multiple probability signal is delivered on lead 970 into a comparator 980 which compares the determined multiple probability signal appearing on lead 970 to predetermined multiple probability signals appearing on leads 985 and 986 which are delivered from a constants generator 990. In the event that the determined multiple probability signal appearing on lead 970 exceeds the predetermined multiple probability signals appearing on leads 985, the comparator circuit 980 acts to deliver the appropriate signals on leads 350 and 355 to the display 360 as previously discussed.

Figure 9:
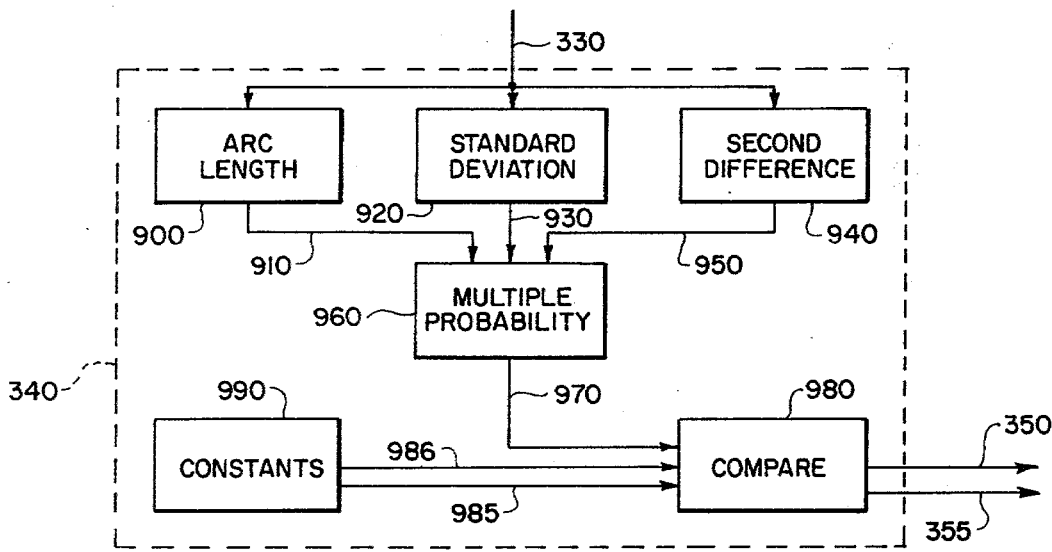

In the embodiments shown in FIGS. 3 and 7-9, and as discussed above, several approaches can be taken. In the actual reduction to practice, as shown in FIG. 3, the processor 350 is conventional and is available from Hewlett-Packard Corporation as Model HP-2108 conventionally programmed to execute the arc length, the standard deviation, the second difference, and/or the multiple probability calculations. However, it is to be expressly understood that FIGS. 7-9 represent a constructive reduction to practice in which hardware versions are shown to implement the teachings of the present invention. Constants generators 740, 840 and 990 are well known in the art and can comprise, for example, simple analog voltage references. Comparators 720, 820 and 980 are also well known in the art as being capable of comparing a given voltage signal to a reference value and outputting a distinctive level change only when the given voltage exceeds the reference value. Finally, devices 700, 800, 900, 920, 930, 940, and 960 can be a microprocessor specifically programmed to perform the calculations.

Although the present invention has been described with a certain degree of particularity, it is understood that the present disclosure has been made by way of example and that changes in details of structure may be made without departing from the spirit thereof.

I claim:

1. An improvement to a system mounted on an aircraft for detecting clear air turbulence in the earth's atmosphere having means for sensing infrared radiation in the water vapor rotational wavelength band in a single atmospheric volume located ahead of said aircraft, said improvement to said sensing means comprising:
 means for receiving said infrared radiation in the 27–33 micrometer wavelength range in said water vapor rotational band existing in said single atmospheric volume, said receiving means being a two degree thallium bromoiodide lens, said lens being A.R. coated for peak transmission in the 25–35 micrometer range, and
 means for orienting said receiving means upwardly to an elevation between 8° to 12° from the flight path of said aircraft.

2. An improvement to a system mounted on an aircraft for detecting clear air turbulence in the earth's atmosphere having means for sensing infrared radiation in the water vapor rotational wavelength band in a single atmospheric volume located ahead of said aircraft, said improvement to said sensing means comprising:
 means for receiving said infrared radiation in the 27–33 micrometer wavelength range in said water vapor rotational band existing in said single atmospheric volume, said receiving means using a two degree thallium bromoiodide lens having an A.R. coating for peak transmission in the 25–35 micrometer range, and an $SrF_2$ interference filter peaking at 27–33 micrometers, and
 means for orienting said receiving means upwardly to an elevation between 8° to 12° from the flight path of said aircraft.

3. The improved system of claim 2 further comprising:
 a radiometer receptive of said infrared radiation in the water vapor rotational wavelength band from said receiving means, said radiometer generating an analog voltage signal proportional to the sensed infrared radiation,
 means receptive of said analog voltage signal for generating a signal proportional to the arc length ratio of said analog voltage signal,
 means for generating a predetermined arc length ratio signal,
 means comparing said proportional arc length ratio signal to said predetermined arc length ratio signal for generating an output only when the magnitude of the proportional arc length ratio signal exceeds the magnitude of the predetermined arc length ratio signal, and
 means operative with said output for generating a clear air turbulence alert.

4. The improved system of claim 2 further comprising:
 a radiometer receptive of said infrared radiation in the water vapor rotational wavelength band from said receiving means, said radiometer generating an analog voltage signal proportional to the sensed infrared radiation,
 means receptive of said analog voltage signal for generating a signal proportional to the standard deviation of said analog voltage signal,
 means for generating a predetermined standard deviation signal,
 means comparing said determined standard deviation signal to said predetermined standard deviation signal for generating an output only when the magnitude of the determined standard deviation signal exceeds the magnitude of the predetermined standard deviation signal, and
 means operative with said output for generating a clear air turbulence alert.

5. The improved system of claim 2 further comprising:
 a radiometer receptive of said infrared radiation in the water vapor rotational wavelength band from said receiving means, said radiometer generating an analog voltage signal proportional to the sensed infrared radiation,
 means receptive of said analog signal for generating a signal proportional to the multiple probability of the aforesaid signals,
 means for generating a predetermined multiple probability signal,
 means comparing said proportional multiple probability signal to said predetermined multiple probability signal for generating an output only when the magnitude of the proportional multiple probability signal exceeds the magnitude of the predetermined multiple probability signal, and
 means operative with said output for generating a clear air turbulence alert.

6. A system mounted on an aircraft for detecting clear air turbulence in the earth's atmosphere, said system comprising:
 an optical assembly oriented upwardly to an elevation of substantially 10° from the flight path of said aircraft comprising:
 (a) a thallium bromoiodide lens, said lens being receptive of infrared radiation in the water vapor rotational wavelength band in a single atmospheric volume located ahead of said aircraft, said lens being further A.R. coated for peak transmission in the 25–35 micrometer range,
 (b) a chopper for periodically interrupting the received infrared radiation,
 (c) a 27–33 micrometer wavelength $SrF_2$ interference filter placed in the path of said received infrared radiation, and
 (d) a sensor receptive of the filtered, interrupted received infrared radiation for generating an analog signal corresponding to the intensity of said radiation,
 a radiometer receptive of said analog signal for amplifying said analog signal, means receptive of said amplified analog signal for generating an alert output when the intensity of said received radiation exceeds a predetermined condition, and means operative upon receipt of said output for producing an alert signal.

7. An improvement to a system mounted on an aircraft for detecting clear air turbulence in the earth's atmosphere having means for sensing infrared radiation in the water vapor rotational wavelength band in a single atmospheric volume located ahead of said aircraft, said improvement to said sensing means comprising means for orienting said sensing means upwardly to an elevation substantially at 10° from the flight path of said aircraft.

8. An improvement to a system mounted on an aircraft for detecting clear air turbulence in the earth's atmosphere having means for sensing infrared radiation in the water vapor rotational wavelength band in a single atmospheric volume located ahead of said aircraft, said improvement comprising:

means in said sensing means for receiving said infrared radiation in said water vapor rotational band existing in said single atmospheric volume, means cooperative with said receiving means for generating a first alert signal whenever the intensity of said received radiation exceeds a first predetermined value, said first alert signal being generated when a clear air turbulence of intensity between 0.1 G and 0.4 G is being detected, and means cooperative with said receiving means for generating a second alert signal whenever the intensity of said received radiation exceeds a second predetermined value, said second alert signal being generated when a clear air turbulence of intensity greater than 0.4 G is detected.

* * * * *